US 6,657,546 B2

(12) United States Patent
Navarro et al.

(10) Patent No.: US 6,657,546 B2
(45) Date of Patent: Dec. 2, 2003

(54) INTEGRATED WATER TREATMENT CONTROL SYSTEM WITH PROBE FAILURE DETECTION

(76) Inventors: Pablo F. Navarro, 5375 Overpass Rd., Santa Barbara, CA (US) 93111; T. Lance Slater, 5375 Overpass Rd., Santa Barbara, CA (US) 93111

( * ) Notice: Subject to any disclaimer, the term of this patent is extended or adjusted under 35 U.S.C. 154(b) by 0 days.

(21) Appl. No.: 10/033,361

(22) Filed: Dec. 28, 2001

(65) Prior Publication Data

US 2002/0117430 A1 Aug. 29, 2002

Related U.S. Application Data

(63) Continuation of application No. 09/071,529, filed on May 1, 1998, which is a continuation-in-part of application No. 08/743,280, filed on Oct. 4, 1996, now Pat. No. 5,895,565.

(51) Int. Cl.[7] ............................................. G08B 21/00
(52) U.S. Cl. .................. 340/653; 340/603; 210/85; 210/149; 210/167; 210/96.1
(58) Field of Search ................... 340/603, 606, 340/609, 653, 654, 655; 210/85, 96.1, 108, 143, 149, 169, 198.1, 182, 192, 252, 259, 241, 662, 739

(56) References Cited

U.S. PATENT DOCUMENTS

| | | | | |
|---|---|---|---|---|
| 4,224,154 A | * | 9/1980 | Steininger | 210/85 |
| 4,830,757 A | * | 5/1989 | Lynch et al. | 210/96.1 |
| 5,422,014 A | * | 6/1995 | Allen et al. | 210/143 |
| 5,460,723 A | * | 10/1995 | Bourbigot et al. | 210/259 |
| 5,547,584 A | * | 8/1996 | Capehart | 210/241 |
| 5,584,990 A | * | 12/1996 | Sugimoto | 210/259 |
| 5,616,239 A | * | 4/1997 | Wendell et al. | 210/43 |

* cited by examiner

Primary Examiner—Daryl Pope
(74) Attorney, Agent, or Firm—Randall L. Reed; Levin & Hawes, LLP

(57) ABSTRACT

The integrated water treatment control system incorporates control of filtration, heating, chemical treatment and water conditioning; a programmable display shows values of key parameters, operational settings and system status; a user-selectable multi-line, multi-language display panel has menus and subgenus; a remote access displays through modems and computers; an in-line computation of water saturation index handles sensor and panel keyboard inputs; and a dynamic probe failure detection system is also included.

12 Claims, 3 Drawing Sheets

| ORP | OK |
|---|---|
| SANITIZER | OK |
| pH | OK |
| CONDUCTIVITY | OK |
| HEATER | OK |
| PUMP | OK |
| SATURATION | OK |
| CONFIGURATION | |

STATUS — 70

2a

| mV | 750 |
|---|---|
| PPM | 1.5 |
| pH | 7.5 |
| uS/cm | 1,250 |
| Temp F | 80 |
| Influent psi | 25 |
| Effluent psi | 20 |
| gpm | 800 |

72 — READINGS

2b

| ORP | AUTO |
|---|---|
| SANITIZER | OFF |
| pH | AUTO |
| CONDUCTIVITY | AUTO |
| HEATER | AUTO |
| PUMP | AUTO |

CONTROL — 74

2c

| ORP | AUTO |
|---|---|
| Calibrate | 750 |
| Setpoint | 725 |
| Alarm low | 650 |
| Alarm high | 850 |
| Limit Timer | 30 |
| Run Time | 20 |
| Shock | 061595 |

76 — ORP SUBMENU

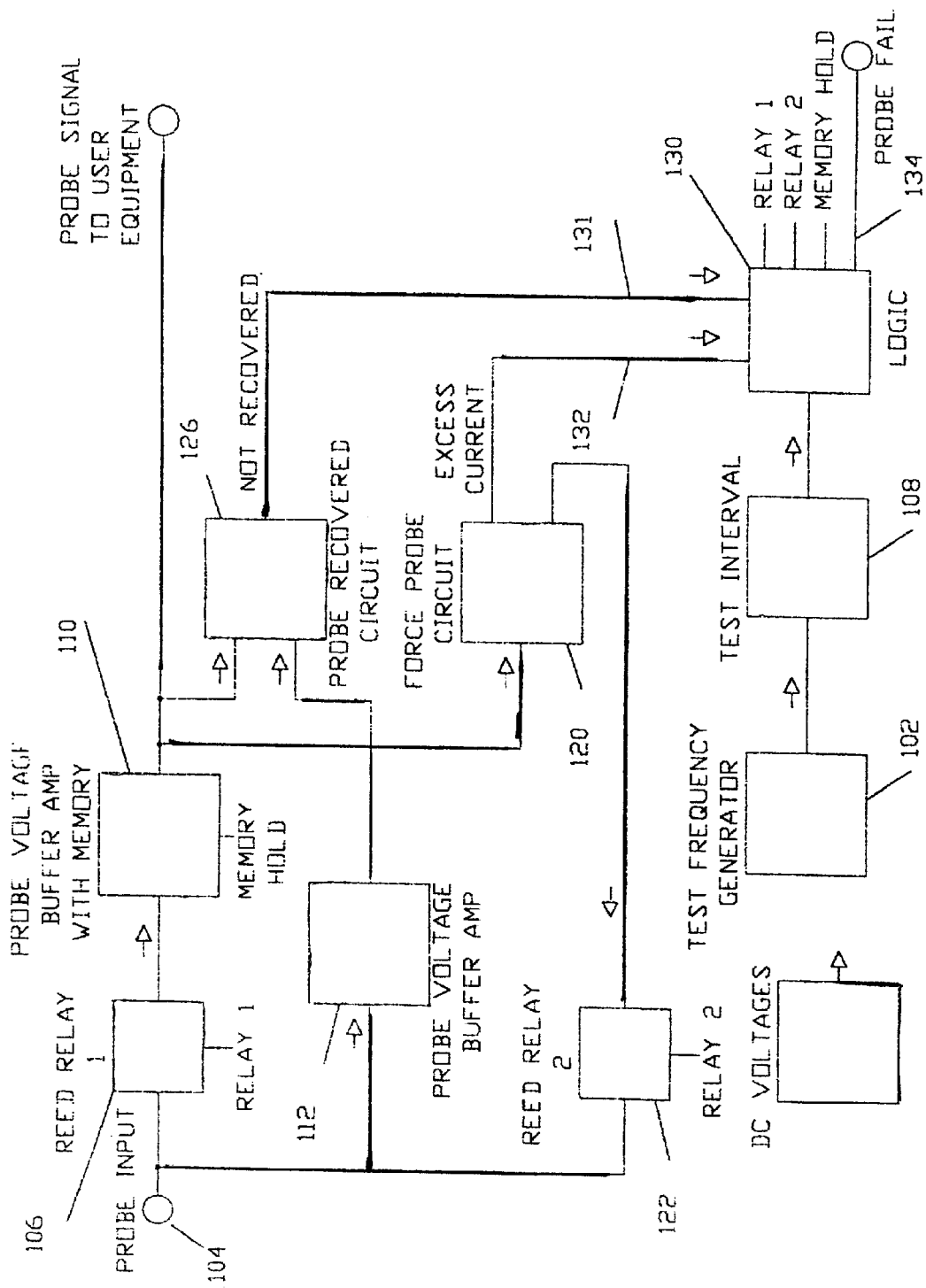
FIGURE 3  OPEN PROBE DETECTOR BLOCK DIAGRAM

INTEGRATED WATER TREATMENT CONTROL SYSTEM WITH PROBE FAILURE DETECTION

This application is a continuation of application Ser. No. 09/071,529, filed on May 1, 1998, which is a continuation in part of application Ser. No. 08/743,280, filed on Oct. 4, 1996, U.S. Pat. No. 5,895,565.

BACKGROUND OF THE INVENTION

The invention relates to a water treatment control system, particularly one that integrates the control of various aspects of a water reservoir or stream using various probes and which includes provision for probe failure detection. Modern water treatment requires the use of both physical and chemical processes. They have traditionally been controlled independently. Typical applications of water treatment systems include, but are not limited to, municipal or industrial water treatment plants, cooling towers, swimming pools, agricultural or food processing plants, and carwash systems.

The physical processes include pumping of the water being treated through filters to remove suspended particles and replacement of contaminated water with fresh water. The chemical processes include injection of sanitizers, oxidizers, pH adjustment chemicals, biocides and other chemicals. In addition, heaters or coolers are used to maintain proper water temperature.

All these processes depend on the use of sensors, timers and outputs for control and monitoring, including remote display and operation. Because the equipment is usually made by different manufacturers, each process has an independent control system which results in large, cumbersome installations and a lack of compatibility and an inability to communicate between different instruments.

An object of the present invention is to integrate all the monitoring and control functions into a single control unit using a microprocessor to manage the different processes. Such an integrated control system makes it easy for the operator to supervise all the different aspects of the water treatment system and to respond rapidly to any malfunction or other emergency.

Another object is to access the control unit remotely by modem and computer, and simulate the display remotely of the actual on-site panel for the purpose of monitoring and control from a remote location.

A further object of the invention, using a microprocessor, is the monitoring of water balance conditions through the computation of the saturation index, or Langelier Index, based on water pH, temperature, alkalinity and hardness. This index shows whether the water is properly balanced, or corrosive, or scaling.

Still another object, using a microprocessor, includes a dynamic probe failure test based on recovery analysis of an induced sensor offset condition. This test is more reliable and more general than static probe failure testing used in conventional applications. In particular, it can be applied to any type of sensing element.

BRIEF SUMMARY OF THE INVENTION

The invention provides an integrated water treatment control system for a water source. The system includes various water treatment elements as well as first means to circulate water from the water source through the water treatment elements, and second means to sense multiple physical characteristics of the circulated water and to determine if the sensed characteristics are within or outside a given range, and to produce a first signal when the sensed characteristics are outside a given range. Third means are also provided to treat the circulating water in response to the first signal until the characteristics sensed to be outside the range return to within the given range.

In particular, the present system provides a water treatment control system in which the sensed characteristics may include clogging of a filter through which the circulating water stream passes, temperature variations of the circulating water stream within and outside the given range, the pH of the water stream, particulate inclusions within the water stream, dissolved solids within the water stream, the oxidation reduction potential (ORP) of the water stream and the conductivity of the water stream. In response to any one or more of these sensed conditions being outside a given range, treatment of the water stream is affected to return the sensed condition to within the given range.

Preferably the system employs probes to detect various of the sensed conditions, and also provides for periodic checking of the probes to make sure that they have not failed. To detect failure of a probe sensor, the system preferably includes a fifth means to accept and temporarily store the output of the sensor, sixth means to temporarily disconnect the first signal from the third means and to apply an out of range signal to the fifth means, and seventh means to measure the recovery of the fifth means from the out of range signal, thereby to detect, by a failure to remove; the failure of the given sensor or probe. Upon detection of such failure, means are also provided to generate a sensor failure alarm. Further, preferably the seventh means also measures the out of range signal itself and generates a sensor failure alarm when the out of range signal is excessive.

BRIEF DESCRIPTION OF THE DRAWINGS

The invention will be further described in connection with the accompanying drawings in which:

FIG. 2 presents various screen displays of the controller included in the system; and FIG. 3 is a schematic diagram of a preferred open probe detection circuit included in the system.

DETAILED DESCRIPTION

The General System

Figure 1:
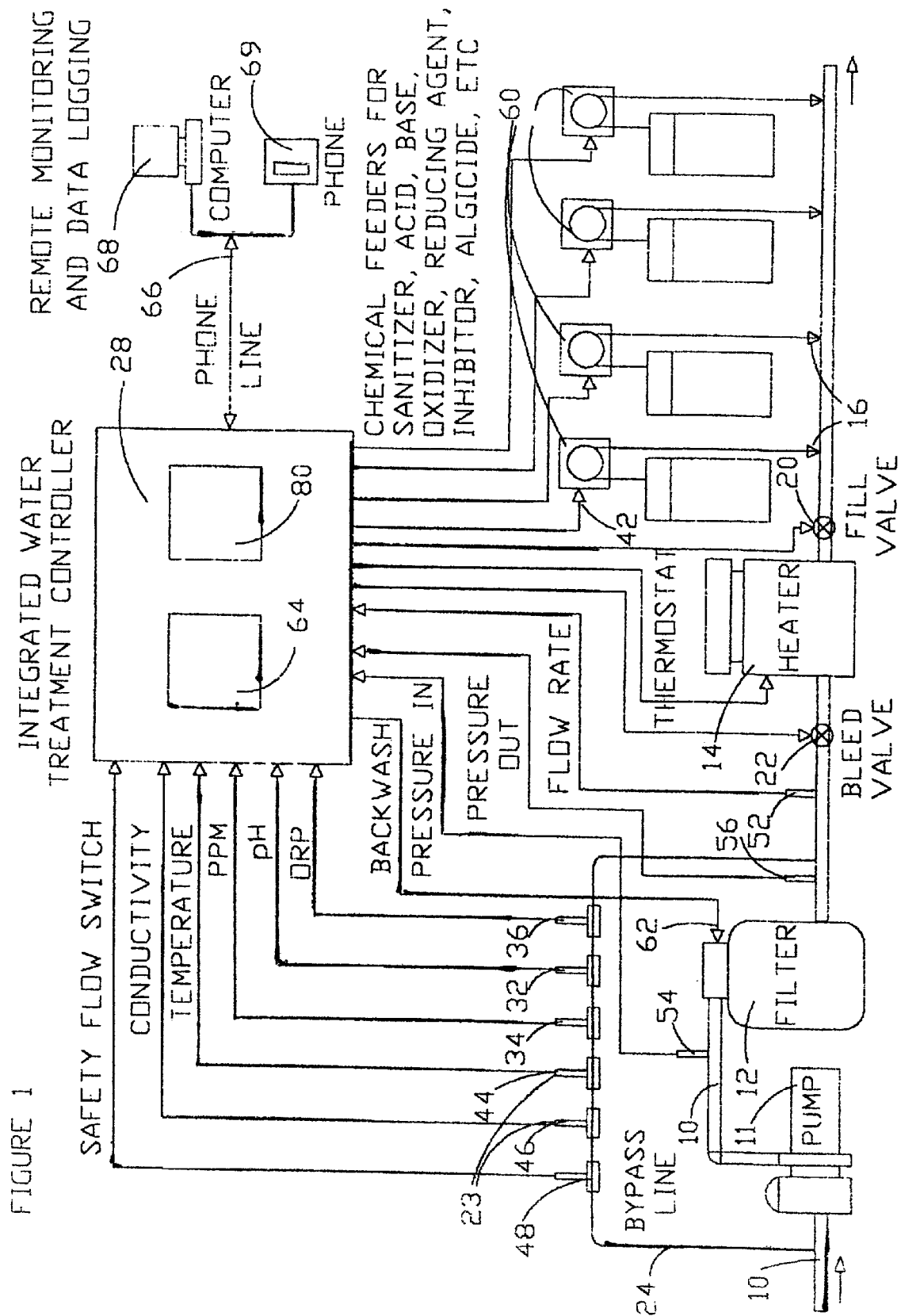
FIG. 1 is a schematic diagram of an integrated water treatment control system constructed in accordance with the present invention.

As previously stated, the present integrated water treatment control system may be used to monitor and treat most any source of water, and the water in a swimming pool, or the water employed in food processing plant or carwash system. Often this water is drawn from the source, evaluated, then recirculated back to the source. At times the water may be drawn from a municipal or other water supply, evaluated, then used and not recirculated—agricultural systems often do this. The present system can be used to evaluate most any flowing stream of water, whether recirculated or not.

FIG. 1 shows a schematic of the integrated water treatment control installed along the tubing of a flowing stream of water. The water is pumped through a circulation line 10 by pump 11. In line 10 is a filter 12, heater 14, chemical injection points 16, bleed valve 20, and fill valve 22. The pump may be Model 11-090 made by Sta-Rite Industries located at 600 Jefferson St., Waterford, Wis. 53185. The filter may be Model 13-035 made by StaRite Industries located at 600 Jefferson St., Waterford, Wis. 53185.

Sensors 23 are mounted either directly on the main circulation line 10 or on a bypass line 24 for sampling of the water. The various sensors 23 send their signals to a control unit 28 where they are processed for display, analysis and activation of the different chemical feeders, heater, filter valves, as well as the bleed and fill valves.

Included in sensors 23 is a pH sensor 32. It monitors the acidity of the water and is used to determine the activation of the chemical feeders for acid or base feed. Such a sensor is sold by Cole-Parmer located in Niles, Ill., the sensor being designated as sensor model H-05994-30.

A PPM sensor 34 is used to monitor the concentration of sanitizer using an amperometric or potentiostatic measurement. Such a sensor is manufactured by Fisher-Rosemount located in Irvine, Calif., the sensor being designated as sensor model 499 TFC.

An ORP sensor 36 measures the oxidation-reduction potential of the sanitizer, which is related to its activity. Such a sensor is sold by Cole-Parmer located in Niles, Ill., the sensor being designated as sensor model H-27006-21. The input from either sensor 34 or 36 (or both) can be used to determine activation of a chemical feeder 42 for maintaining the proper sanitizer level in the flowing water stream. A similar feeder can also be used to reduce the concentration of excess sanitizer by adding a reducing agent, such as after superchlorination of a swimming pool.

Temperature sensor 44 monitors the temperature of the flowing water stream, and is used to regulate the thermostat of the heater 14 in a well known fashion. In addition, temperature data can be employed by control unit 28 to correct the signals of other sensors such as pH, ORP and conductivity which are temperature dependent. Such a sensor is manufactured by Cole-Parmer located in Niles, Ill., the sensor being designated as sensor model H-93824-00. The heater 14 may, for example, be model 16-045 made by Teledyne Laars located in Moorpark, Calif. 93021.

A conductivity sensor 46 monitors the conductivity of the water and is used to determine the Total Dissolved Solids (TDS) in the water and to determine initiation of water replacement through the bleed and fill valves 20 and 22. This is particularly applicable to cooling towers, swimming pools and hot water spas which are subject to evaporation and concentration of dissolved solids. A presently preferred sensor is manufactured by Signet Scientific Co. located in El Monte, Calif., the sensor being designated as sensor model 3-2820-1.

Additionally, a safety flow switch 48 can be installed on the bypass line 24 to alert the control unit to a lack of water flow and erroneous readings if the bypass line is shut off or becomes obstructed. Such a switch may be model RF2000P made by GEMS located in Plainville, Conn.

A flow rate sensor 52 is installed on the main recirculation line 10 to monitor the flow of water in the recirculation line 24 and to enable the control unit to keep track of the cumulative amount of water going through the filter 12. A presently preferred sensor 52 is manufactured by OMEGA located in Stamford, Conn., the sensor being designated as sensor model FP-6000. Flow interruption results in an alarm condition and shutdown of the chemical feeders 42. Cumulative flow rate may be integrated by control unit 28 and used as an option to determine initiation of backwashing of the filter.

Two pressure sensors 54 and 56, or a differential pressure unit, are installed before and after the filter to determine water pressure drop across the filter. They are used to determine proper pump operation and initiation of filter backwashing when it becomes overloaded with dirt, debris and impurities. A presently preferred pressure sensor is sold by Omega Engineering located in Stamford, Conn., the sensor being designated as sensor model PX 242-060G5V.

The chemical feeders, collectively designated as 60, are used for injection of chemicals from the various tanks for water treatment, including but not limited to sanitizers, pH control chemicals (acid or base), oxidizers, inhibitors, biocides and algicides. Appropriate chemical feeders are those manufactured by Pulsafeeder located in Punta Gorda, Fla., and identified as model Dolphin-50.

Backwashing of the filter is done to clean the filter by applying a "backwash" signal 62 to the filter to reverse the flow of water through the sand or filter medium thereby to dislodge accumulated particles and debris which reduce the flow of water. This is controlled by the program of the control unit to activate the proper valves for flow reversal, flushing water to waste and refilling as required. It can be initiated automatically by programming for elapsed time, or for pressure differential across the filter or accumulated water flow. It can also be programmed with a combination of these factors, such as time and differential pressure. In large installations with several filters, backwashing is done sequentially, one filter after another with a wait time between each filter to assure proper closure of the valves.

All data is displayed on a panel display 64 of control unit 28, and is available for remote monitoring and data logging over phone lines 66 through modems or other devices connected to computer 68. The data can also be stored in the control unit on memory files or chips.

The Controller

A prototype of the present system has been constructed. While preliminary tests indicate that generally it performs in a satisfactory fashion, further testing remains to be completed. In particular, control unit 28 has been loaded with a computer program to process the various sensor inputs for display analysis and activation of the different elements to treat the circulating water through line 10. The presently preferred system employs as a central processing unit a S80C652-2A68 manufactured by Phillips, operating at 16 MHz. It also includes a PROM array such as one using models 1-27C010 and 3-27C256manufactured by National Semiconductor. The PROM is connected to the CPU and stores the computer program for controlling the various operations and processes of the control system. This program has not been fully tested and debugged but it is believed to operate in a reasonably satisfactory fashion at present to affect the major processing, display, analysis and activation functions of the control unit. Its integration into the controller and the activation by the controller of the various elements of the system is believed to be readily apparent and well within the skill of those of ordinary abilities in the design and implementation of such control systems.

Programmable Display Menu

Because of the complexity of the system, it is highly desirable to use a microprocessor-based controller or control unit 28 with a multi-line, multi-screen, multi-language, multi-unit display that allows the display and correction of information for the different processes. This reduces hardware requirements such as display lights, readouts, switches, etc.

An example of an 8-line multi-screen display 64 is shown in FIG. 2. The first three screens or screen areas 70, 72 and 74 are continuously scrolled to show the status of the different systems, the readings of the sensors and the control settings.

The last screen or screen area 76 is an example of a submenu, in this case the submenu for ORP, with the different options for the sub-submenus, such as Calibration of the sensor, Setpoint for control, Alarms high and low, Limit Timer for overfeed protection and actual Run Time. All the different parameters may offer similar submenus. This allows a high degree of flexibility in the programmable functions available to the operator.

Remote Access by Computer

Remote computer access of the water treatment controller 28 is important for operators of multiple facilities, particularly if they are spread over large geographic areas. The present invention allows actual operation of the controller through modems and telephone lines or radio transmission with a simulated display at remote computer 68 that corresponds to the actual display produced by the on-site control unit.

The remote unit operator can get real-time readings of the different sensors and operating conditions. The operator can also change the settings, subject to password security protection, and may access several units at one location over one phone line, if desired.

On-Line Computation of Saturation Index

The saturation index (SI), also known as the Langelier Index, is employed in the control unit 28 to determine whether the water in line 10 is corrosive or is subject to scaling by precipitation of calcium carbonate. This is particularly important in cooling tower and swimming pool applications to extend the longevity of the equipment.

The Langelier Index is calculated through a formula of the type:

$$SI=pH+TF+CF+AF-12.1$$

Properly balanced water requires an SI value near zero. It the SI value is above 0.3, the water is scaling. If the SI value is below −0.3, the water is corrosive to plaster and metallic parts.

In the Langelier Index formula, pH represents the acidity of the water and is normally determined with the pH sensor 32, or electrode, that is part of the control system. TF is a temperature factor that is also determined by a temperature probe 44 that is part of the system. CF is the Calcium Hardness factor which is not easily determined with a sensor. In that case, the Calcium Hardness can be determined with a test kit and the resulting value manually entered through the panel keyboard 80 on the control unit. AF is the Alkalinity Factor which is also determined with a test kit and entered manually through keyboard entry.

Previously, calculation of SI required the use of special tables which many operators find difficult to manipulate. The system described here automatically calculates the Saturation Index and displays the resulting value and water condition on the display panel. If the water becomes corrosive or scaling, the operator is immediately alerted by an alarm on the display screen 64.

The operator can also use the program to calculate what-if simulations by manually entering values for pH and temperature that are normally obtained from the sensors. Two of the parameters, Calcium Hardness and Alkalinity, are not obtained from sensor readings but rather from test kits and manual entries. This is not a serious problem since they are slow to change in value, whereas the other two, pH and temperature, can change rapidly. It is sufficient for the operator to manually check and update these values periodically.

Dynamic Probe Failure Detection

Probe failure can cause serious problems in automatic control systems that are designed to run unattended for long periods of time. For instance, false sensor readings can result in overfeeding or underfeeding of chemicals, both of which can have adverse effects on the equipment and/or users.

Conventional probe failure detection systems are of two kinds. The simplest and least effective system depends on the failure to cause an out-of-range alarm condition. The second and more effective system depends on monitoring a physical property of the sensor itself, such as its resistance or impedance, which is not always possible or reliable. Both of these systems are basically passive and static. Either approach at times may not detect failure of a probe.

The present invention preferably uses a dynamic probe failure detection system, one in which the sensor signal is purposely changed from its actual reading for a short period of time then released to recover. The controller checks to see if the true value is restored within a reasonable amount of time. Even though this system requires more sophisticated electronics, it offers much better protection for the system and processed water. Another advantage is that it can be applied to any type of sensing device. Additional advantages include:

A. It is transparent to probe application device; i.e., has no effect on the probe input signal to the measuring and/or controlling system.

B. It can be made to work on either polarity probe.

C. It can be made to work with small or large signals.

D. It detects either a shorted probe (pinched wire, corrosion) or open probe (broken probe, cut wire, disconnected plug).

E. It will work with "static" (infinite load resistance) voltage probes.

A preferred dynamic probe failure detection system is schematically illustrated in FIG. 3. It includes various elements or components that operate and interrelate in a periodic manner. Specifically, every minute for example as set by the "Test Frequency Generator" 102, the probe input 104 is disconnected, by "Reed Relay 1" 106, from the application device (e.g. the controller 28) for a few seconds (10 seconds for example), as preset by the "Test Interval" unit 108. During this test interval the application device is supplied with the same signal it had before the test interval using a film capacitor analog memory included in the "Probe Voltage Buffer Amp With Memory" 110. This prevents any upset in the application.

At the beginning of the test, the probe voltage in probe voltage buffer 112 is forced for a few milliseconds (20 ms for example), as preset by the "Logic," to a voltage about 50 mV higher, for example, than it had before the test interval. This voltage is generated by the "Force Probe Circuit" 120. Reed relay "2" 122 connects the probe to this forcing voltage source. After the probe is released from the forcing voltage, the buffer amp 112 should recover to its previous value before the end of the test interval. A comparator circuit, "Probe Recovered Circuit" 126, verifies that the probe voltage, from the "Probe Voltage Buffer Amp" (without memory) did recover to near (within 25 mV for example) its previous value. If it does not recover, a signal is applied to "Logic" circuit 130 over line 131. Another part of the "Force Probe Circuit" 120 checks the current needed to force the probe voltage. If it is more than a few microamps (50 $\mu$A for example), an "Excess Current" condition is sent to the "Logic" circuit 130 over line 132.

If, at the end of the test interval, either the probe fails to recover or excess forcing current was detected, the "probe fail" output is activated by the "Logic" circuit 130 over line 134, which signal it applied to controller 28.

In general, concerning the system preferably all components are proven, readily available and off the shelf. Power supply voltages are appropriate to the components used. Reed relays arch preferred because they have the greatest "off" state resistance. Buffer amplifiers such as amplifier 110 preferably have MOS inputs because neither the probe nor the memory capacitor flay have the ability to generate or retain appreciable current. Preferably the probe signal is fairly large so that buffer amplifiers may have a relatively modest DC gain, such as a gain of 3. However, a gain range (depending on the probe voltage and application device needs) anywhere from 0.05 to 200 can be used if desired. Probe voltages typically are DC and in the range of +400 to +900 mV. But the present circuit system can employ smaller, larger, negative or bipolar voltage values if desired. The logic circuit 130 includes a power on reset delay to assure that normal probe operation has time to stabilize before any test interval is initiated after the system is turned on or reset.

The overall concept of the circuit is to temporarily store the present probe voltage (whether amplified or not), force the probe to a slightly different voltage (measuring current while doing so to see if there is a shorted line or probe), and let the probe return to its normal operating value if it can (not defective probe or an open line). The times allowed for the test to occur preferably are based on observing the particular probe's output in response to a forced voltage change.

Another consideration in the present circuit design is to pick a forcing test voltage to be such that the application device (e.g. chemical pump) would eventually turn off if an open probe occurred. For example, if the probe sensed the chlorine level in the water stream, and triggered a pump to add chlorine when a low level had been detected, the forcing test voltage and its associated circuitry would be of a polarity and level that would tend to turn the pump off if an open probe condition occurred. This may be accomplished by applying the forcing test voltage to a capacitor that is discharged by a good probe, but retains and accumulates the applied charge with each forcing test voltage cycle if an open probe condition has occurred. This accumulated voltage is applied to controller 28 to shut off the output in the event of a bad probe determination.

While the presently preferred system has been illustrated and described, variations in the system and in its elements and design may be preferred by others of ordinary skill in the design and implementation of such control systems. Accordingly, the invention is not limited to the preferred embodiment, but rather is as set forth in the following claims.

What is claimed is:

1. A probe system for measuring a given characteristic of a fluid, the probe system including a flow probe which produces a signal proportional to the given characteristic of the fluid and applies that signal to a probe signal utilization system, the probe system including means to detect failure of the probe, the failure detection means including: first means to accept and temporarily store the output of the probe, second means to temporarily disconnect the probe from the probe signal utilization system and to apply an out of range signal to the first means while the probe is disconnected, and third means to measure the recovery of the first means from the out of range signal, thereby to detect failure of the probe, and upon detection of such failure to generate a sensor failure alarm signal.

2. A probe system as set forth in claim 1 in which the third means also measures application of the out of range signal to the first means and generates a probe failure alarm signal when the applied signal is excessive.

3. The apparatus of claim 1 further comprising:
a failsafe means for controlling a given characteristic of the fluid to the probe signal utilization system to cause the probe signal utilization system to modify the characteristics of the fluid in a failsafe manner in response to at least one sensor failure alarm signal for the probe.

4. The apparatus of claim 3, wherein the at least one sensor failure signal is a plurality of sensor failure signals.

5. A method for probe failure detection in a water treatment system including at least one probe for monitoring a parameter of the water treatment system at a given signal indicative of a value for the sensed parameter at the given location which is utilized for monitoring and/or controlling an aspect of the water treatment system through a parameter control unit having a parameter control unit controller operated in response to the probe output signal, comprising the steps of:
temporarily storing the probe output signal and operating the parameter control unit controller in response to the temporarily stored probe output signal;
simulating for a first preselected period of time a probe output signal that is not the stored probe output signal;
after the first preselected period of time, sensing whether the probe output signal returns to the value of the stored probe output signal within a second preselected period of time; and
generating a malfunction signal in the event that the probe output signal does not return to the desired value in the preceding step.

6. The method of claim 5 further comprising the step of:
generating a failsafe control signal to the parameter control unit controller to place the parameter control unit in a failsafe condition is response to at least one malfunction signal.

7. The method of claim 6 wherein the at least one malfunction signal is a plurality malfunction signals.

8. A system for probe failure detection in a water treatment system including at least one probe for monitoring a parameter of the water treatment system at a given signal indicative of a value for the sensed parameter at the given location which is utilized for monitoring and/or controlling an aspect of the water treatment system through a parameter control unit having a parameter control unit controller operated in response to the probe output signal, said system comprising:
means for temporarily storing the probe output signal and operating the parameter control unit controller in response to the temporarily stored probe output signal;
means for simulating for a first preselected period of time a probe output signal that is not the stored probe output signal, after the first preselected period of time, sensing whether the probe output signal returns to the value of the stored probe output signal within a second preselected period of time; and
means for generating a malfunction signal in the event that the probe output signal does not return to the desired value in the preceding step.

9. The system of claim 8 further comprising:
Means for generating a failsafe control signal to the parameter control unit controller to place the parameter control unit in a failsafe condition is response to at least one malfunction signal.

10. The system of claim 9 wherein the at least one malfunction signal is a plurality malfunction signals.

11. The system of claim 8 further comprising:
A failsafe means for controlling a given characteristic of the fluid to the probe signal utilization system to cause the probe signal utilization system to modify the characteristics of the fluid in a failsafe manner in response to at least one sensor failure alarm signal for the probe.

12. The system of claim 11, wherein the at least one sensor failure signal is a plurality of sensor failure signals.

* * * * *